United States Patent

Colsch

[11] Patent Number: 5,957,092
[45] Date of Patent: Sep. 28, 1999

[54] ROTATABLE ANIMAL TETHER DEVICE

[76] Inventor: Charles W Colsch, 22796 Canyon Lake Dr. S., Canyon Lake, Calif. 92587

[21] Appl. No.: 08/883,586

[22] Filed: Jun. 26, 1997

[51] Int. Cl.$^6$ ....................................................... A01K 3/00
[52] U.S. Cl. ............................................................. 119/787
[58] Field of Search ..................................... 119/786, 787, 119/788, 791

[56] References Cited

U.S. PATENT DOCUMENTS

| | | | |
|---|---|---|---|
| 2,087,176 | 7/1937 | Webb | 119/787 |
| 2,435,081 | 1/1948 | Howard | 119/786 |
| 2,525,890 | 10/1950 | Gage | 119/787 |
| 2,790,419 | 4/1957 | Sullivan | 119/786 |
| 3,100,476 | 8/1963 | Peak | 119/786 |
| 5,353,747 | 10/1994 | Fain | 119/786 X |

Primary Examiner—Michael J. Carone
Assistant Examiner—Elizabeth Shaw

[57] ABSTRACT

A new Rotatable Animal Tether Device for allowing free rotation of a secured leash and reduces the tangling and knotting of the leash. The inventive device includes a shaft member having an upper end and a lower end adapted for insertion into the ground, a top disk member and a bottom disk member being spaced apart and both being fixedly mounted on the upper end of the shaft member. A rotating disk member having a tab portion included on its outer perimeter is positioned between the top disk member and the bottom disk member. The rotating disk member is rotatably mounted on the upper end of the shaft member to permit free rotation of the rotating disk member around the upper end of the shaft member. The end of a flexible member for securing an animal, such as a leash, is attached to the tab portion of the rotating disk member. To help prevent an animal tethered to the device from pulling the shaft out of the ground, the lower end of the shaft is inserted into the ground so that the bottom disk member is resting on the surface of the ground.

1 Claim, 2 Drawing Sheets

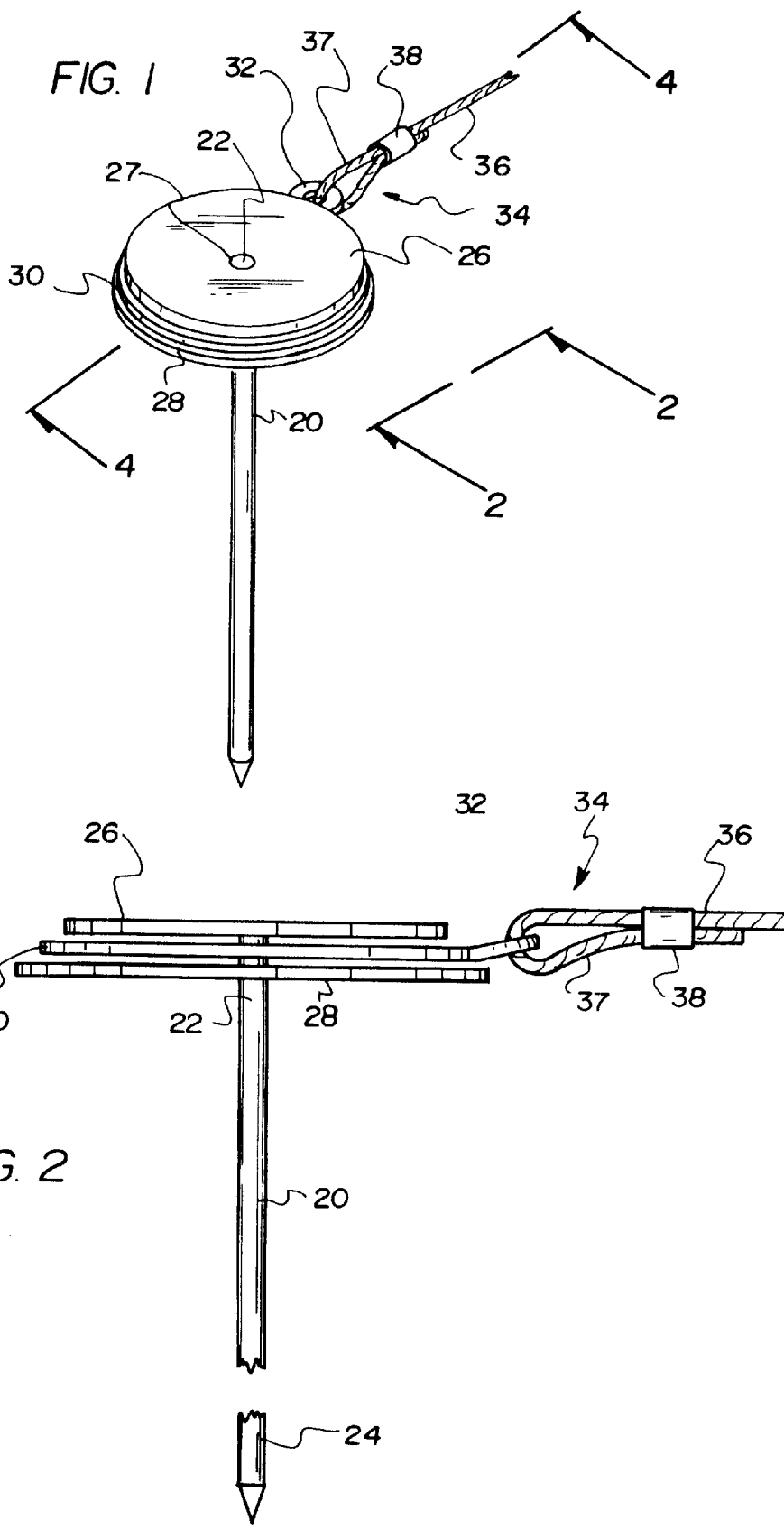

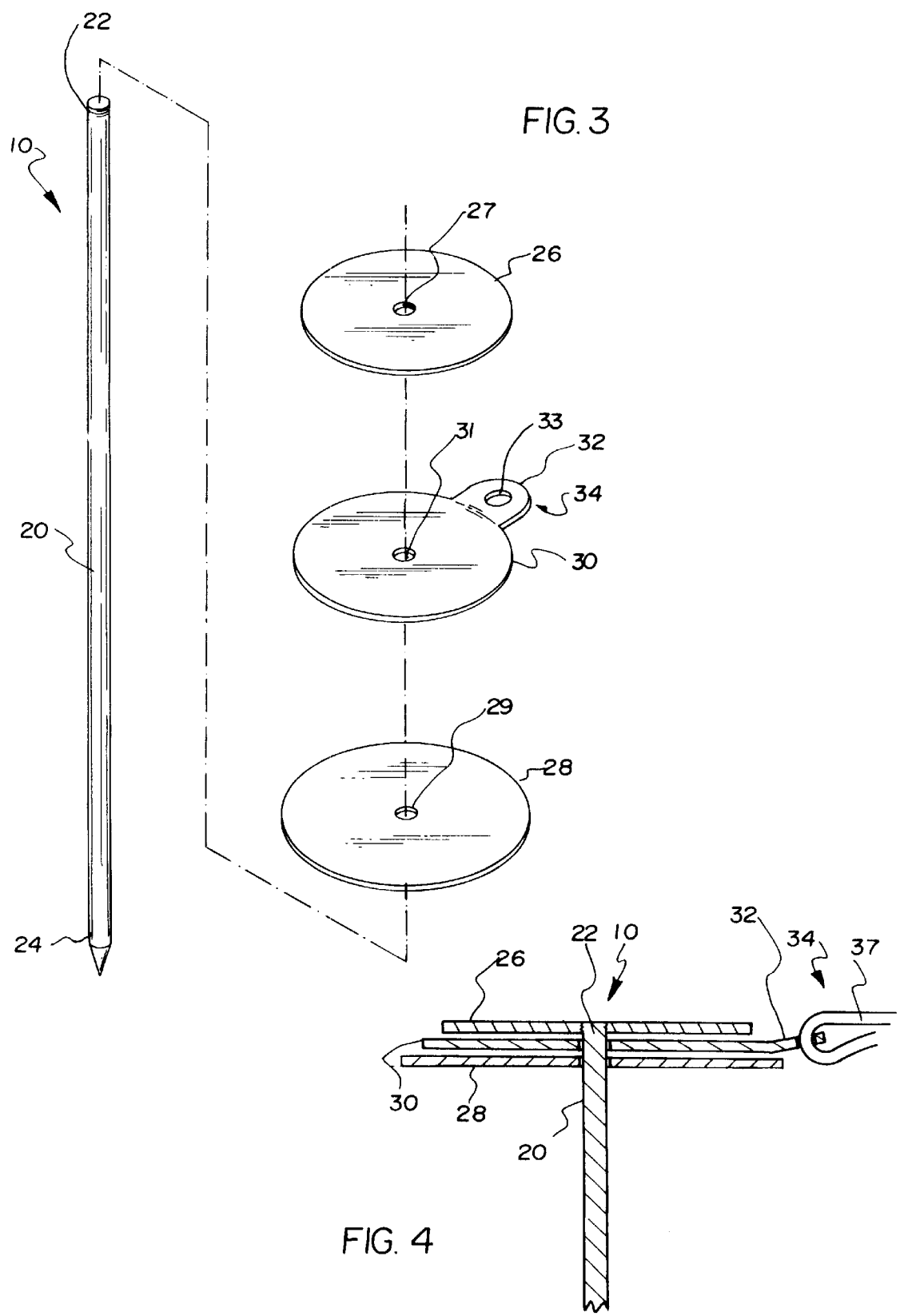

ROTATABLE ANIMAL TETHER DEVICE

BACKGROUND OF THE INVENTION

1. Field of the Invention

The present invention relates to animal restraining devices and more particularly pertains to a new Rotatable Animal Tether Device for allowing free rotation of a secured leash and reduces the tangling and knotting of the leash.

2. Description of the Prior Art

The use of animal restraining devices is known in the prior art. More specifically, animal restraining devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal restraining devices include U.S. Pat. No. 5,161,487; U.S. Pat. No. 4,982,701; U.S. Pat. No. Des. 351,692; U.S. Pat. No. 4,620,506; U.S. Pat. No. 4,491,091; and U.S. Pat. No. 4,197,818.

While these devices fulfill their respective, particular objectives and requirements, the aforementioned patents do not disclose a new Rotatable Animal Tether Device. The inventive device includes a shaft member having an upper end and a lower end adapted for insertion into the ground, a top disk member and a bottom disk member being spaced apart and both being fixedly mounted on the upper end of the shaft member. A rotating disk member having a tab portion included on its outer perimeter is positioned between the top disk member and the bottom disk member. The rotating disk member is rotatably mounted on the upper end of the shaft member to permit free rotation of the rotating disk member around the upper end of the shaft member. The end of a flexible member for securing an animal, such as a leash, is attached to the tab portion of the rotating disk member. To help prevent an animal tethered to the device from pulling the shaft out of the ground, the lower end of the shaft is inserted into the ground so that the bottom disk member is resting on the surface of the ground.

In these respects, the Rotatable Animal Tether Device according to the present invention substantially departs from the conventional concepts and designs of the prior art, and in so doing provides an apparatus primarily developed for the purpose of allowing free rotation of a secured leash and reduces the tangling and knotting of the leash.

SUMMARY OF THE INVENTION

In view of the foregoing disadvantages inherent in the known types of animal restraining devices now present in the prior art, the present invention provides a new Rotatable Animal Tether Device construction wherein the same can be utilized for allowing free rotation of a secured leash and reduces the tangling and knotting of the leash.

The general purpose of the present invention, which will be described subsequently in greater detail, is to provide a new Rotatable Animal Tether Device apparatus and method which has many of the advantages of the animal restraining devices mentioned heretofore and many novel features that result in a new Rotatable Animal Tether Device which is not anticipated, rendered obvious, suggested, or even implied by any of the prior art animal restraining devices, either alone or in any combination thereof.

To attain this, the present invention generally comprises a shaft member having an upper end and a lower end adapted for insertion into the ground, a top disk member and a bottom disk member being spaced apart and both being fixedly mounted on the upper end of the shaft member. A rotating disk member having a tab portion included on its outer perimeter is positioned between the top disk member and the bottom disk member. The rotating disk member is rotatably mounted on the upper end of the shaft member to permit free rotation of the rotating disk member around the upper end of the shaft member. The end of a flexible member for securing an animal, such as a leash, is attached to the tab portion of the rotating disk member. To help prevent an animal tethered to the device from pulling the shaft out of the ground, the lower end of the shaft is inserted into the ground so that the bottom disk member is resting on the surface of the ground.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Rotatable Animal Tether Device apparatus and method which has many of the advantages of the animal restraining devices mentioned heretofore and many novel features that result in a new Rotatable Animal Tether Device which is not anticipated, rendered obvious, suggested, or even implied by any of the prior art animal restraining devices, either alone or in any combination thereof.

It is another object of the present invention to provide a new Rotatable Animal Tether Device which may be easily and efficiently manufactured and marketed.

It is a further object of the present invention to provide a new Rotatable Animal Tether Device which is of a durable and reliable construction.

An even further object of the present invention is to provide a new Rotatable Animal Tether Device which is susceptible of a low cost of manufacture with regard to both materials and labor, and which accordingly is then susceptible of low prices of sale to the consuming public, thereby making such Rotatable Animal Tether Device economically available to the buying public.

Still yet another object of the present invention is to provide a new Rotatable Animal Tether Device which provides in the apparatuses and methods of the prior art some of the advantages thereof, while simultaneously overcoming some of the disadvantages normally associated therewith.

Still another object of the present invention is to provide a new Rotatable Animal Tether Device for allowing free rotation of a secured leash and reduces the tangling and knotting of the leash.

Yet another object of the present invention is to provide a new Rotatable Animal Tether Device which includes a shaft member having an upper end and a lower end adapted for insertion into the ground, a top disk member and a bottom disk member being spaced apart and both being fixedly mounted on the upper end of the shaft member. A rotating disk member having a tab portion included on its outer perimeter is positioned between the top disk member and the bottom disk member. The rotating disk member is rotatably mounted on the upper end of the shaft member to permit free rotation of the rotating disk member around the upper end of the shaft member. The end of a flexible member for securing an animal, such as a leash, is attached to the tab portion of the rotating disk member. To help prevent an animal tethered to the device from pulling the shaft out of the ground, the lower end of the shaft is inserted into the ground so that the bottom disk member is resting on the surface of the ground.

Still yet another object of the present invention is to provide a new Rotatable Animal Tether Device that is hard for an animal tethered to the device to pull it out of the ground.

Even still another object of the present invention is to provide a new Rotatable Animal Tether Device that is positioned close to the ground to present a low profile in order to reduce the risk of a person tripping on the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new Rotatable Animal Tether Device according to the present invention.

FIG. 2 is a side view of the present invention taken from the perspective of the line 2—2 on FIG. 1.

FIG. 3 is a exploded perspective view of the rotatable animal tether device.

FIG. 4 is a cross-sectional view of the upper end of the rotatable animal tether taken from line 4—4 on FIG. 1.

DESCRIPTION OF THE PREFERRED EMBODIMENT

With reference now to the drawings, and in particular to FIGS. 1 through 5 thereof, a new Rotatable Animal Tether Device embodying the principles and concepts of the present invention and generally designated by the reference numeral 10 will be described.

As best illustrated in FIGS. 1 through 5, the Rotatable Animal Tether Device 10 comprises a shaft member 20 having an upper end 22 and a pointed lower end 24 adapted for insertion into the ground.

On the upper end 22, there are a top disk member 26, a rotating disk member 30 and a bottom disk member. The top disk member 26 is fixedly mounted on the upper end 22 inserted into its centrally located center hole 27. Below and spaced apart from the top disk member 26 is the bottom disk member 28. The bottom disk member 28 is also fixedly mounted on the upper end 22 of the shaft member 20 which is inserted through its centrally located center hole 29. The top disk member 26 and the bottom disk member 28 may be fixedly mounted on the upper end 22 by means of a weld at each of their center holes 27, 29.

The rotating disk member also has a centrally located center hole 31 to allow insertion of the upper end 22 of the shaft member 20 through it for mounting the rotating disk member 30 on the upper end 22. The rotating disk member 30 is positioned between the top disk member 26 and the bottom disk member 28 on the upper end 22. The rotating disk member 30 rotatably mounted to the upper end 22 if the shaft member 20 so that the rotating disk 30 is permitted to freely rotate around the upper end 22.

The rotating disk member 30 also has a securing means 34 for attaching to a flexible member 36 such as a leash. As shown in FIG. 1, the securing means 34 may be a tab portion 32 included on the outer perimeter of the rotating disk member 30. The tab portion 32 has a securing hole 33 in which the securing end 37 of the flexible member 36 is inserted through. As shown in FIG. 2, the securing end 37 may then be looped around and coupled to the flexible member 36 by a fastener 38 to attach the flexible member 36 to the tab portion 32 of the rotating disk member 30.

In use, the lower end 24 of the shaft member 30 should be inserted into the ground to a depth so that the bottom disk member 28 is positioned next or adjacent to the surface of the ground. This makes it very difficult for the rotatable animal tether device 10 to be pulled out of the ground because the leash or flexible member 36 is positioned almost horizontal to the surface of the ground. To remove the rotatable animal tether device 10 from the ground, one must apply a some what vertical force on the shaft member 20.

It is also recommended that the diameter of the rotating disk member 30 be larger than the diameter of the top plate member 26 to help the free rotation of the rotating disk member 30 and its tab portion 32 and attached flexible member 36 about the upper end 22 of the shaft member 20. To help prevent of the accumulation of ground debris such as dirt between the bottom disk member 28 and the rotating disk member 30, it is further recommended that the diameter of the bottom disk member 28 should be larger than the diameter of the rotating disk member 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rotatable animal tether device, for securing an end of a flexible member for restraining an animal, said rotatable animal tether device comprising:

a shaft member having an upper end and a lower end, said lower end being adapted for insertion into the ground;

a top disk member being fixedly mounted on said upper end of said shaft member, said top disk member having a planar circular configuration for minimizing the protrusion by said top disk member from a ground surface when said shaft member is inserted in the ground;

a bottom disk member being spaced apart from said top disk member and being fixedly mounted on said upper end of said shaft member, said bottom disk member having a planar circular configuration for positioning snugly to a ground surface when said shaft member is inserted in the ground; and a rotating disk member having a planar circular configuration and being spaced between said top disk member and said bottom disk member, and being rotatably mounted on said upper end of said shaft member for permitting free rotation of said rotating disk member around said upper end of said shaft member;

wherein the top disk, the bottom disk and the rotating disk member have a substantially similar thickness;

wherein said rotating disk member has a planar tab portion for attaching said end of said flexible member, said tab portion integrally coupled to an outer perimeter of said rotating disk member and residing within a plane that extends upwardly and outwardly from a plane in which the rotating disk member resides for aiding the prevention of the accumulation of debris;

wherein said planar tab portion has a hole for inserting therein said end of said flexible member, wherein the hole is positioned about an axis that forms an actuate angle with a horizontal;

wherein said hole is located radially further outward from said shaft member than a perimeter of said bottom disk member to reduce any interference between said flexible member and said bottom disk member;

wherein a diameter of said rotating disk member is larger than a diameter of said top disk member for aiding the free rotation of said rotating disk member and said tab portion about said upper end of said shaft member;

wherein a diameter of said bottom disk member is larger than the diameter of said rotating disk member for aiding the prevention of the accumulation of debris between said bottom disk member and said rotating disk member;

wherein said lower end of said shaft member is adapted for being inserted into the ground to a depth such that said bottom disk member is positioned adjacent the surface of said ground.

* * * * *